UNITED STATES PATENT OFFICE.

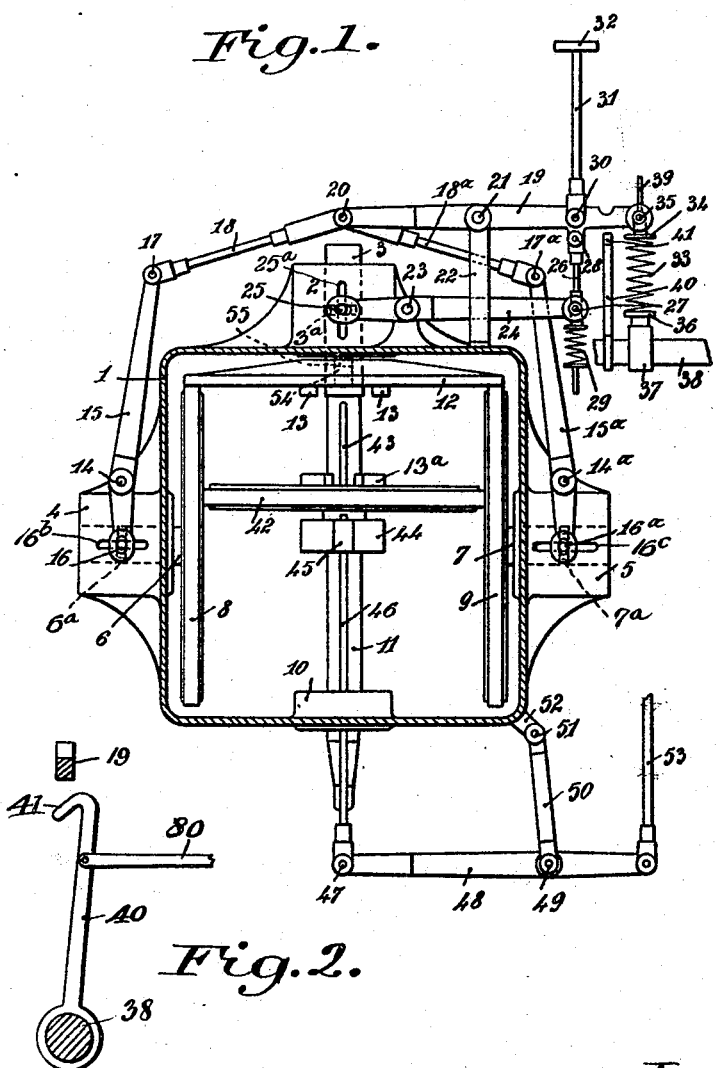

JACQUES CAMILLE NARDON, OF SURESNES, FRANCE.

POWER-TRANSMITTING DEVICE FOR MOTOR-VEHICLES.

1,211,335.  Specification of Letters Patent.  Patented Jan. 2, 1917.

Application filed January 29, 1915. Serial No. 5,034.

*To all whom it may concern:*

Be it known that I, JACQUES CAMILLE NARDON, a citizen of the Republic of France, whose post-office address is 39 and 41 Rue de Neuilly, in Suresnes, Department of the Seine, France, have invented a certain new and useful Improvement in Power-Transmitting Devices for Motor-Vehicles, of which the following is a specification.

The present invention relates to devices more particularly used for transmitting power by friction from the engine to the driving wheels of a motor vehicle, but also capable of use for other purposes.

The essential feature of the device herein described resides in that the friction clutch usually employed is dispensed with for throwing the motor in and out of gear.

The device is so arranged that, by means of the friction gear, any desired speed from a given minimum to a given maximum may be imparted to the driving wheels, in addition to which the device enables a direct-drive to be established, when desired, between the power-shaft of the engine and the live axle or other driving shaft of the vehicle, in cases where the latter can be driven at top speed.

In the accompanying drawing, Figure 1 illustrates more or less diagrammatically a power-transmitting device constructed in accordance with the present invention, and Fig. 2 is a detail view of the hook for locking the parts in disengaged position.

A casing 1 which contains the majority of the acting parts, is formed with four bearings of which one 2 for the power shaft 3, two others 4, 5 for the shafts 6, 7 of friction disks 8, 9 and another 10 for the driven shaft 11. The power shaft 3 is driven from an engine not shown, at any desired constant speed, and it carries a friction disk 12 as well as clutch-claws 13, the latter being integral with the shaft or with the disk. The power shaft 3 is capable of a sliding movement in its bearing 2, by means hereinafter described, in such a manner that, whatever may be its axial position, it remains connected with the prime mover of the engine, neither of which latter are shown here.

On the casing 1 is pivoted at 14 a two-armed lever 15, one end of which is formed with an elongated slot in which is arranged a stud 16 operating in a slot 16$^b$ in the bearing 4 and which fits into a groove indicated at 6$^a$ of the shaft 6, and acts to shift the said shaft in its bearing 4, as hereinafter explained. The other end of the lever 15 is pivoted at 17 to a link 18. A similar lever 15$^a$ pivoted at 14$^a$ and fitted with a stud 16$^a$, operating in a slot 16$^c$ in the bearing 5 and which fits into a groove, indicated at 7$^a$, of the shaft 7 acts to shift the said shaft in its bearings 5, as hereinafter explained. The other end of the lever 15$^a$ is pivoted at 17$^a$ to a link 18$^a$. The links 18, 18$^a$ are jointed together and to a two-armed lever 19 at 20 which latter is pivoted at 21 on a bracket 22. On the casing 1 is also pivoted at 23 a two-armed lever 24, one end of which is formed with an elongated slot in which is arranged a stud 25 which fits into a groove of the shaft 3 and acts to shift the said shaft in its bearing 2, as hereinafter described. The lever 24 is connected to the lever 19 by a link 26, pivoted to both at 27, 28 respectively, the lever 24 being subjected to the constant stress of a spring 29, which tends to push the right-hand arm of the lever upward, and the left-hand arm downward. To the lever 19 is pivoted, at 30 a rod 31 by means of which, through a pedal or some other suitable operating device 32, the lever can be forced downward, for the purpose hereinafter explained. The said lever 19 is likewise subjected to the constant stress of a spring 33 held for instance, between two buffers of which one, 34, is pivoted at 35, while the other 36 is in contact with an eccentric or cam 37 fast on a shaft 38 to which rotary motion may be imparted by hand through any suitable lever or gearing.

The object of the eccentric or cam 37 is to compress the spring 33 more or less, on turning the shaft 38, for the purpose hereinafter explained. To the end of the lever 19 may also be connected a rod 39 by which the lever may be operated, if desired. On the shaft 38 is loosely fitted an arm 40 the end of which is formed into a hook 41, which may engage over the end of the lever 19 for the purpose of holding it locked in a downward position, as hereinafter explained.

As advantageously disclosed in Fig. 2, the arm 40 of the hook is connected to a rod or any suitable device 80, whereby said arm may be oscillated from the shaft 38 to move the hook 41 into and out of engagement with the lever 19.

On the driven shaft 11 which may, for instance, be coupled to the shaft acting to drive the live axle in the case of a motor car, is mounted a friction disk 42 in such a manner that, by means of a spline 43, it can be slid along the shaft while at the same time being carried along thereby in any position it may occupy on the said shaft. The said disk is formed or provided with clutch claws 13ª which can be made to engage the clutch claws 13 on the friction disk 12. On the hub 44 of the disk 42 is formed a lug 45 in which is fastened a rod 46 which passes through a hole in the casing 1 and is jointed, at 47, to a two-armed lever 48 pivoted at 49 to a link 50, which is itself jointed at 51 to a bracket 52. The lever 48 is connected to an operating rod 53, by means of which the friction disk 42 may be slid along its shaft 11 so as to be brought into any desired position thereon, relatively to the other friction disks 8, 9 and 12.

The power shaft 3 and the driven shaft 11 which are independent, but in alinement with each other may be so arranged, for instance, that the overhanging end of the shaft 11 may take its bearing in the adjacent end of the shaft 3, for which purpose the said shaft 11 terminates in a trunnion 54 fitted in a hole 55 bored in the said shaft 3.

The operation is as follows: Assuming the parts to be in the position shown and the driver wishes to impart slow motion to the driven shaft 11, the first operation is to throw the entire device out of gear, that is to say, cause the friction disk 12 to be disengaged from the friction disks 8, 9 and the latter disks to be disengaged from the friction disk 42. For that purpose, he presses on the pedal 32, thereby causing levers 19 and 24 to move downwardly in opposition to the action of the springs 33 and 29 respectively. The lever 19 draws the links 18, 18ª upwardly to a slight extent and causes the levers 15, 15ª to move so that the shafts 6 and 7 are slid outwardly to a slight extent, carrying with them the respective friction disks 8, 9, which thus become disengaged from the friction disk 42. At the same time, the lever 24 draws the power shaft 3 upwardly to a slight extent, whereby the friction disk 12 is carried with it, so that the said disk is also caused to become disengaged from the disks 8, 9. The next operation is to cause the friction disk 42 to be slid along its shaft 11 until it assumes, relatively to the disks 8, 9 the position required for the speed to be imparted to the said shaft. For that purpose, he operates the rod 53 which causes displacement of the rod 46 connected to the hub 44 of the disk 42. When the adjustment is effected, the operator sets the rod 53 in position, by any means usually employed for that purpose. The next operation is to release the pressure exerted on the pedal 32 and in doing so, the levers 19, 24 are forced back into their normal position by the push of their respective springs 33, 29, with the result that the friction disk 12 is forced into engagement with the disks 8, 9, while at the same time the latter are forced into engagement with the disk 42.

The force of the springs 33, 29 is so calculated as to produce sufficient pressure of the disks against each other to cause the power of the shaft 3 to be transmitted to the shaft 11 without slipping. If desired, the said force may be varied. By way of an instance, a cam or an eccentric 37 may be fastened to a shaft 38 and thus be made to more or less compress the spring 33 by turning the said cam.

The pedal 32 may be held in its depressed position by means of any suitable or known device, such for instance as a hooked lever 40, the hook 41 of which may be made to engage over the top of the lever 19 when the latter is depressed by the said pedal.

When all the friction disks are in contact with each other, the power shaft 3 transmits its motion to the driven shaft 11 at a speed depending upon the position of the disk 42 relatively to the center of the disks 8, 9, as will be readily understood.

When it is desired to change the speed, the disks are thrown out of gear with each other in the manner hereinbefore described and the disk 42 is shifted to another position corresponding to another speed, after which the disks 12, 8, 9 are again made to engage each other and the disks 42.

When conditions permit of the top speed being used, the operations are as follows: Throw the disks out of gear and shift the disk 42 until its claws 44 engage with the claws 13 on the disk 12. The shafts 3, 11 are then coupled together and revolve at the same speed.

Claims:

1. In a device of the character described, the combination of drive and driven shafts, stub shafts, movable transmission elements on said shafts, levers arranged to shift said transmission elements, a device connected to simultaneously actuate certain of said levers, means for normally acting to maintain said transmission elements in engagement, and means for adjusting said last-named means, substantially as described.

2. In a device of the character described, the combination of a drive shaft, stub shafts, movable transmission elements on said drive and stub shafts arranged to be moved into and out of engagement, a driven shaft, a transmission element on said driven shaft normally in engagement with the transmission elements on said stub shafts, slotted levers for shifting the transmission elements on said drive and stub shafts, means connecting said levers for simultaneous operation, and yieldable means operating in opposition to said last-named means for normally maintaining the elements engaged, substantially as described.

3. In a device of the character described, the combination of a slidable drive shaft, slidable stub shafts, transmission elements arranged between said drive and stub shafts, studs on said drive and stub shafts, levers provided with slots engaging said studs, means connecting said levers for simultaneous operation to shift said shafts whereby to engage and release the transmission elements, a driven shaft, and a transmission element on said driven shaft normally in engagement with the transmission elements on said stub shafts, substantially as described.

4. In a device of the character described, the combination of slidable drive and stub shafts having each a groove therein, transmission elements on said shafts, levers, studs fitted in the grooves in said shafts and engaged for operation by said levers to shift the shafts, means connected to operate said levers, a driven shaft, and a transmission element on said driven shaft arranged to engage said before-mentioned transmission elements, substantially as described.

5. In a power transmitting device, the combination of a slidable drive shaft provided with a groove, slidable stub shafts arranged angularly to said drive shaft and provided each with a groove therein, transmission elements arranged between said shafts, a driven shaft, a transmission element on said driven shaft adapted to be engaged by the transmission elements on said drive and stub shafts, levers, studs fitted in the grooves in said drive and stub shafts and connected to move with said levers for shifting the shafts, means connecting said several levers for simultaneous operation, means for normally moving said levers to engage the transmission elements, and means for adjusting the tension of said last-mentioned means, substantially as described.

6. In a power transmitting device, the combination of a frame, a drive shaft journaled in said frame, stub shafts journaled in the frame angularly with respect to said drive shaft, transmission elements arranged to connect said drive and stub shafts, levers for shifting said transmission elements into and out of engagement, a toggle device connected to operate a pair of said levers, a connection between said toggle device and a third lever, means connected to actuate said toggle device, a driven shaft, and a transmission element on said driven shaft for engaging the first-named transmission elements, substantially as described.

7. In a power transmitting device, the combination of a frame, bearings provided on said frame, a drive shaft and a plurality of stub shafts journaled in said bearings, transmission elements for connecting said shafts, levers connected to shift said transmission elements into and out of engagement, links connecting a pair of said levers, means coupled to said links for simultaneously oscillating the associated levers, a connection between a third lever and said means, yieldable means for normally maintaining the transmission elements engaged, a driven shaft, and a transmission element on said driven shaft arranged to engage said first-named transmission elements, substantially as described.

8. In a power transmitting device, the combination of a frame, bearings in said frame, a drive shaft slidably journaled in one of said bearings, stub shafts slidably journaled in other of said bearings, transmission elements on said shafts, levers for shifting the shafts in said bearings to engage and disengage the transmission elements, interconnected links between the levers for shifting said stub shafts, a lever connected to said links, a connection between said last-named lever and the lever for shifting said drive shaft, means for operating said several levers, means for restoring the transmission elements into engagement, a driven shaft journaled in said frame, and a transmission element on said driven shaft adapted for engagement with said first-named transmission elements, substantially as described.

9. In a power transmitting device, the combination of a frame, bearings on said frame, a drive shaft slidably journaled in one of said bearings and having a groove therein, a transmission element carried by said drive shaft, stub shafts slidably mounted in other of said bearings and provided each with a groove therein, transmission elements on said stub shafts for engagement with said first-named transmission element, levers, studs fitted in the grooves in said several shafts and connected to said levers for shifting the shafts axially, a toggle device connecting the stub shaft operating levers, means connecting said toggle device and the drive shaft operating lever for simultaneous movement, means for normally moving said levers to maintain the transmission elements engaged, means for adjusting said last-named means, a driven shaft journaled in said frame, and a transmission element on said driven shaft adapted to engage with the above-mentioned transmission elements, substantially as described.

10. In a power transmitting device, the combination of a frame, bearings provided on said frame and formed with slots therein, a drive shaft slidably mounted in one of said bearings and having an annular groove therein, a transmission element carried by said drive shaft, stub shafts slidably mounted in other of said bearings and provided each with an annular groove therein, transmission elements on said stub shafts normally in engagement with said first-named transmission element, studs slidable in the slots in said bearings and fitted in the annular grooves in said several shafts, slotted levers connected to actuate said studs, links connecting the stub shaft operating levers, a lever connected to said links, a connection between said last-named lever and the drive shaft operating lever, means for simultaneously actuating said several levers, yieldable means for normally maintaining said levers in position to engage the transmission elements, means for adjusting said last-named means, a driven shaft journaled in said frame, a transmission element slidably mounted on said driven shaft and arranged to engage said several above-mentioned transmission elements, and means for shifting said last-named transmission element on the drive shaft, substantially as described.

11. In a power transmitting device of the character described, the combination of a frame, a drive shaft journaled in said frame, stub shafts also journaled in said frame, transmission elements mounted between said several shafts, means for shifting said transmission elements into and out of engagement, spring means for normally maintaining said elements in engagement, a shaft, means on said shaft for adjusting said spring means, means for locking said first-named means in position to maintain the elements disengaged, a driven shaft, and means for coupling said driven shaft to the transmission elements, substantially as described.

12. In a power transmitting device, the combination of a frame, a drive shaft journaled in said frame, a transmission element on said drive shaft, stub shafts journaled in said frame angularly to said drive shaft, transmission elements connecting said several shafts, means for shifting said transmission elements into and out of engagement, spring means normally maintaining said transmission elements engaged, a shaft associated with said spring means, means on said shaft for adjusting said spring means, a latch device associated with said shaft for maintaining the elements disengaged, a driven shaft journaled in said frame, a transmission element slidably mounted on said driven shaft and arranged to be engaged by said above transmission elements, a lever fulcrumed on said frame and connected to move said last-named transmission element, and a connection for actuating said lever, substantially as described.

In witness whereof I have hereunto set my hand this 14th day of January 1915, in presence of two subscribing witnesses.

JACQUES CAMILLE NARDON.

Witnesses:
R. H. BRANDON,
A. V. DAVIES.

Copies of this patent may be obtained for five cents each, by addressing the "Commissioner of Patents. Washington, D. C."